Figure 1:
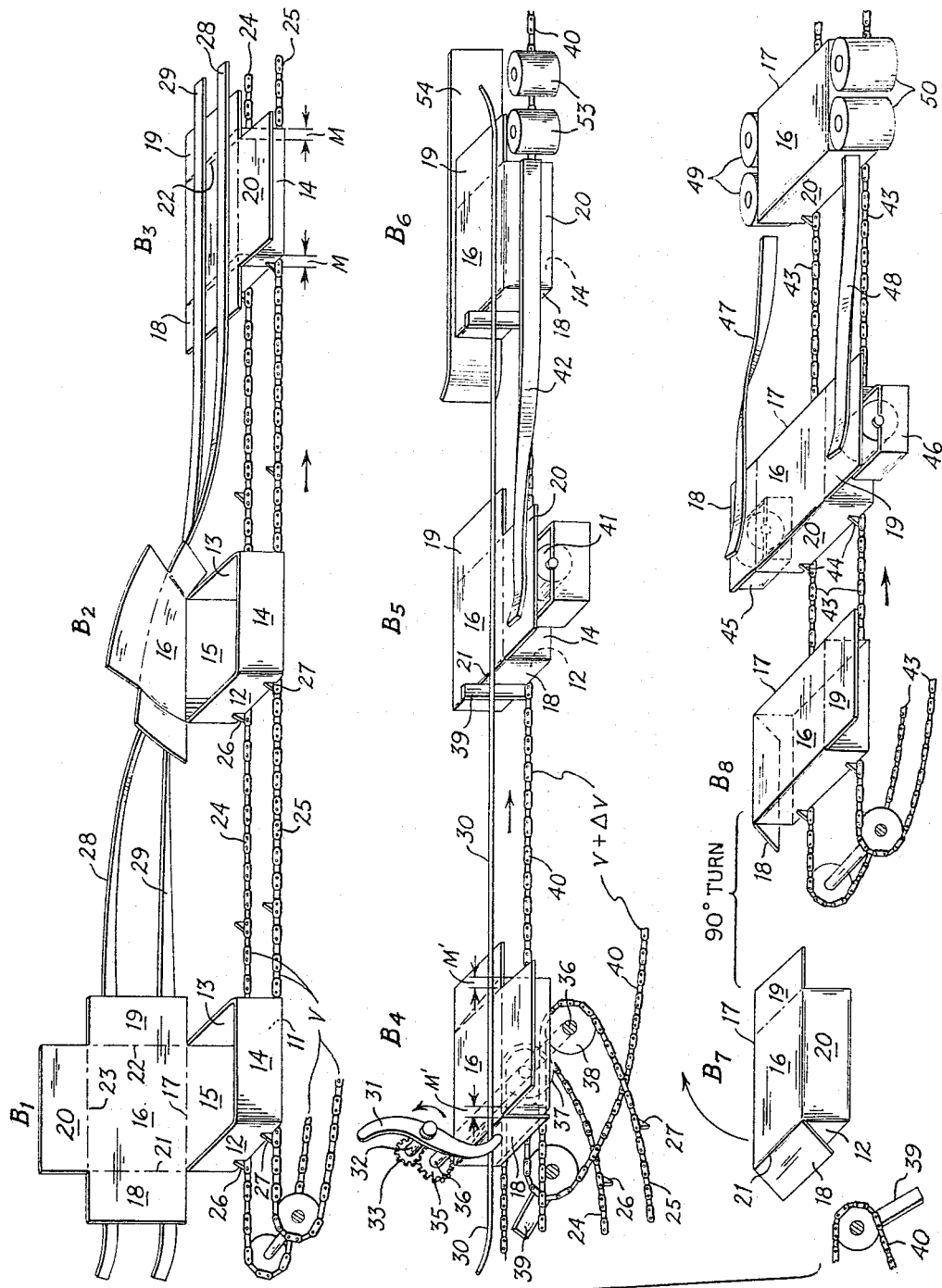

INVENTOR.
THOMAS R BAKER
BY Howard E Russell
his atty.

United States Patent Office 3,267,637
Patented August 23, 1966

3,267,637
METHOD OF CLOSING, SQUARING AND SEALING FOLDING BOXES COMPRISING COVER FLAPS
Thomas R. Baker, Los Altos, Calif., assignor, by mesne assignments, to Kliklok Corporation, New York, N.Y., a corporation of Delaware
Filed Oct. 17, 1963, Ser. No. 316,807
4 Claims. (Cl. 53—38)

This invention relates to improvements in the closing and sealing procedure of folding boxes of the type in which the box cover is equipped with a flap or flaps which are adhered to a vertical box wall or walls in order to seal the box.

A style of box which was widely adopted in the frozen food packaging field is equipped with three flaps, a cover front flap to be adhered to the front wall of the box body, and cover side flaps, commonly referred to as "charlottes" in the trade, to be adhered to the side walls of the box body.

In the closing and sealing of hinge cover folding boxes it is important to maintain the box cover in accurate register with respect to the box body as otherwise an imperfect seal is produced or a misshapen box results.

It is conventional practice to advance boxes along a conveyor track with one box side wall leading. During its travel the box is filled with contents, for example frozen foods, while the box cover is in an open position, generally in a substantially vertical plane. In this position the cover does not interfere with the filling procedure, is easily held in open position, for example between a pair of guide rails, and experiences a minimum of air resistance, as it travels in a direction parallel to the plane of the cover.

The conventional closing procedure involves turning of the box after filling into a position in which it travels with the cover hinge line leading, folding the cover into closing position, downfolding of the cover side flaps, and adhering of the side flaps to the box body side walls.

Gluing of the cover side flaps to the box body side walls automatically squares the box and corrects any misalignment which may have existed between the box cover and the box body, more particularly between the flap fold lines and the top edges of the box body side walls.

Downfolding of the box cover is usually accomplished by an overhead plow, or a roller, representing obstacles against which the box cover moves as the box advances, with its cover hinge leading.

Cover misalignment may be caused by uneven breaking of the crease which forms the cover hinge, by unequal frictional engagement of different portions of the cover panel with the folding elements, such as the plow or the roller, and other possible causes.

Once squared by the downfolding and gluing of the cover side flaps, the box is in condition for the folding and gluing of the cover front flap which constitutes the final step of the conventional sealing procedure.

As the cover front flap is in the trailing position at that moment, it is difficult to apply adhesive to it, fold it, and exert the required sealing pressure. It is for this reason necessary, and is common practice, to turn the box again so as to move with one box side wall leading. After turning the box application of adhesive to, and sealing of, the cover front flap presents no difficulties.

Turning of the box by 90 degrees about a vertical axis may basically be accomplished in two different known ways. The first procedure is generally referred to as right-angle turning and involves moving the box by a first conveyor against a stop where the box comes to rest, and subsequent advance by the box by a second conveyor disposed at right angles to the first.

This turning procedure has several disadvantages. It necessitates use of a second conveyor at right angles to a first conveyor, which is not economical from the standpoint of conserving floor space. Secondly, the sudden arrest and subsequent acceleration of the box results in displacement, even loss, of box contents.

An advanced turning procedure in which the box is physically turned about its vertical axis while continuing to move in the same direction is disclosed in the Patent No. 2,984,332 to Pierce, dated May 16, 1961. The Pierce procedure avoids displacement of box contents even at high rates of advance of the box.

Nevertheless, it is highly desirable to eliminate at least one turning procedure, so as to save the expense of the turning equipment, and to have the floor space it occupies.

The present invention provides a procedure which assures accurate alignment or registration of the box cover with the box body and permits the cover front flap to be sealed first. No turning of the box prior to closing of the box cover is required.

The only step of turning the box occurs after closing at which time displacement or partial loss of box contents is no longer a problem.

Closing of the box cover may be accomplished by conventional simple stationary plow or rail means mounted alongside the conveyor track. Such closing devices normally cause misalignment of the cover relatively to the box body because of frictional retardation of the cover with respect to the box body which is being advanced by the box conveyor. Such misalignment is actually taken advantage of in the practice of this invention for the purpose of positively grasping the trailing edge of the cover, more particularly the cover side flap at its fold line and then advancing it relatively to the box body until the box is accurately squared.

The invention may be practiced by conventional box handling equipment, such as standard conveyors, turners, gluing, folding and compressing means and is equally applicable to the heat sealing of boxes to which thermoplastic adhesive was preapplied, as it is applicable to boxes to which adhesive, be it of the thermoplastic or common glue variety, is applied during the closing procedure.

The invention will be explained by a specific description of its application to boxes without preapplied adhesive, but it will be obvious to persons skilled in the art how to modify the gluing and sealing equipment in the event thermoplastic preapplied adhesive is employed which requires activation by preheating in order to effect the bond.

The various objects, features and advantages of this invention will appear more fully from the detailed description which follows accompanied by a drawing showing, for the purpose of illustration, a manner in which the approved method may be carried out. The invention also resides in certain new and original steps and combinations of steps as herein set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying FIGURE 1 forming a part of it and representing a flow diagram illustrating a manner in which the steps of the method may be carried out.

In the following description and in the claims various details will be identified by specific names for convenience. The names, however, are intended to be generic in their application.

The accompanying drawing forming part of this specification discloses certain specific details of construction for the purpose of explanation of broader aspects of the invention, but it should be understood that structural details may be modified in various respects without departure from the principles of the invention and that the invention may be practiced by equipment which is equivalent yet physically different from the devices shown in the drawing.

The box body of the folding box shown in the drawing comprises a box bottom panel 11 to which side walls 12, 13, a front wall 14 and a rear wall 15 are articulated. The particular corner construction of the box is unimportant, as the box may be of glued or of gluelessly interlocked construction.

A cover panel 16 is articulated to the rear wall 15 at a hinge cover fold line 17 and cover side flaps 18, 19 and a cover front flap 20 are articulated to the cover panel along flap fold lines 21, 22 and 23.

In the position $B_1$ the box rests on a conveyor represented by endless conveyor chains 24, 25 fitted with lugs 26, 27 which engage the box body and positively move the box to the right at a velocity $v$. It may be assumed that in the position $B_1$ the box is filled with contents, such as vegetables, frozen or about to be frozen. The box cover is upright in which position it experiences a minimum of air resistance.

As the box advances with its side wall 13 leading, the box cover panel moves into engagement with a pair of curved rails 28, 29 which gradually fold the cover panel into closing position. In position $B_2$ the box cover is in the process of being closed, in position $B_3$ it lies flat on the box body. It will be noted, however, that due to the frictional engagement between the rails 28, 29 and the cover surface the cover is misaligned by an amount M measured at the near box corners. It is evident that if the cover front flap 20 were downfolded and adhesively secured to the front wall 14 a misshapen box would result in which only a poor seal between the trailing flap 18 and the trailing side wall 12 could be formed and no seal at all between the leading flap 19 and the leading side wall 13, as the flap fold line 22 lies within the confines of the box body instead of over the top edge of the side wall 13.

The box continues to travel under an appropriate means for holding down the cover. A hold down bar 30 is shown for this purpose. It may constitute a continuation of the rail 28.

The box next moves into the reach of an appropriate device for downfolding the trailing cover side flap. Such devices are known in the art and may assume a variety of forms. In the illustrated example a substantially S-shaped double arm 31 is shown on a shaft 32 fitted with a drive pinion 33. The pinion 33 is driven by a gear 35 on a shaft 36 to which sprocket gears 37 and 38 are secured. The conveyor chains 24 and 25 are trained around the sprocket gears and the gear ratio is such that the peripheral velocity of the ends of the arms of element 31 is in excess of the velocity $v$ of the conveyor. One of the arms 31 therefore engages the trailing cover side flap 18 and folds it down into approximately vertical position. The precise angle of folding is of minor importance, as the main purpose of the folding operation is to move the trailing cover side flap into a position in which its surface, rather than its terminal edge, is engaged by a transport element about to be described.

The downfolding of the trailing cover side flap may reduce the misalignment M slightly or may leave it unchanged. At any rate, in position $B_4$ a material misalignment M' still exists.

At about this point the box is removed from the driving engagement with the conveyor 24, 25 and comes into the range of action of a suitably shaped transport element which moves at a higher velocity than the conveyor 24, 25, more particularly the box, and engages the box cover panel 16 at the flap fold line 21. As a result, the cover panel is displaced with respect to the box body until the flap fold line moves into alignment with the top edge of the trailing side wall 12 and the flap 18 lies flat against the trailing wall 12.

The transport element may be a reciprocating pusher, but is preferably a lug, arm or element 39 on a second conveyor 40 moving at a linear velocity in excess of the velocity $v$ of the conveyor 24, 25. In the drawing the velocity of the conveyor 40, or the rate of advance of the transport element, is indicated as being $v + \Delta v$.

In position $B_4$ the respective arm 39 on the conveyor 40 comes up behind the box and when it catches up with the box corrects the misalignment and thereafter continues to move the box along at the increased velocity $v + \Delta v$. In order to maintain the proper alignment the transport element is made tall enough to extend above the box cover 16 in distinction from the lugs 26, 27 of the conveyor 24, 25 which are short.

In position $B_5$ the misalignment is corrected and the cover front flap travels over an adhesive applicator 41. It is well understood that in its place would be an adhesive activator, such as a heater, in the event the box flap is coated with a preapplied adhesive. A rail or plow 42 then folds the front flap against the front wall 14, whereafter a pressure unit, represented by pressure rollers 53 and a plate 54, applies pressure for a time sufficient to permit the adhesive to set.

The box may then be disengaged from the conveyor 40 and elements 39, and is shown in this condition in position $B_7$. At this time the trailing cover side flap 18 may swing up slightly due to the fold resistance of the paperboard at the fold line.

The box is then turned by whatever turning means are desired or available. Even if such turning is abrupt, no harm is done, as box contents cannot be thrown from the partially sealed box. Position $B_8$ represents the box after turning.

After turning the cover side flaps of the box are sealed in any convenient manner. This may be done by moving the box by a conveyor 43 having lugs 44 past adhesive applicators 45, 46 and folding rails 47, 48 into a suitable compression device represented by rollers 49, 50.

The entire closing and sealing procedure may thus be carried out by turning the box only once. Also all the steps may be carried out while the box continues to move in a straight line.

What is claimed is:

1. The method of closing, squaring and sealing a folding box comprising a box body, a box cover panel articulated to the rear panel of the box body, a cover front flap and cover side flaps to be adhered to the body front wall and the body side walls, respectively, the method comprising, advancing the box with one box body side wall leading; folding the cover panel into closing position over the box body, folding the trailing cover side flap over the outside of the other body side wall, moving a transport element against the trailing cover side flap to engage the cover panel at the cover side flap fold line and displacing said side flap fold line relatively to the box body until said side flap fold line is in squared position with respect to the top edge of the said other side wall; applying adhesive to the cover front flap and folding it against the body front wall into sealing position; and then turning the box and sealing the cover side flaps.

2. The method of closing, squaring and sealing a folding box comprising a box body, a box cover panel articulated to the rear panel of the box body, a cover front flap and cover side flaps to be adhered to the body front wall and the body side walls, respectively, the method comprising, advancing the box with one box body side wall leading; plowing the cover panel down into closing position over the box body, thereby retarding the cover panel relatively to the box body; folding the trailing cover side flap over the outside of the other body side wall; moving a transport element against the trailing cover side flap to engage the cover panel at the cover side flap fold line, the linear rate of movement of the said transport element being in excess of that of the box body, thereby first advancing the cover panel relatively to the box body and then advancing the entire box at the rate of said transport element; adhering the cover front flap to the body front wall; and finally adhering the cover side flaps to the body side walls.

3. The method of closing, squaring and sealing a folding box comprising a box body, a box cover panel articulated to the rear panel of the box body, a cover front flap and cover side flaps to be adhered to the body front wall and the body side walls, respectively, the method comprising, advancing the box with one box body side wall leading; plowing the cover panel down into closing position over the box body, thereby retarding the cover panel relatively to the box body; folding the trailing cover side flap over the outside of the other body side wall; moving a transport element against the trailing cover side flap to engage the cover panel at the cover side flap fold line, the linear rate of movement of the said transport element being in excess of that of the box body, thereby first advancing the cover panel relatively to the box body and then advancing the entire box at the rate of said transport element; adhering the cover front flap to the body front wall; then advancing the box in a direction parallel to the body side walls; and finally adhering the cover side flaps to the body side walls.

4. The method of closing, squaring and sealing a folding box comprising a box body, a box cover panel articulated to the rear panel of the box body, a cover front flap and cover side flaps to be adhered to the body front wall and the body side walls, respectively, the method comprising, advancing the box by moving the box body at a certain rate and with one box body side wall leading; plowing the cover panel down into closing position over the box body; folding the trailing cover side flap over the outside of the other body side wall; moving a transport element against the trailing cover side flap to engage the cover panel at the cover side flap fold line, the linear rate of movement of the said transport means being in excess of said certain rate, thereby first advancing the cover panel relatively to the box body and then advancing the entire box at the rate of said transport element; then adhering the cover front flap to the body front wall; and finally adhering the cover side flaps to the body side walls.

No references cited.

TRAVIS S. McGEHEE, *Primary Examiner.*